Patented Jan. 6, 1925.

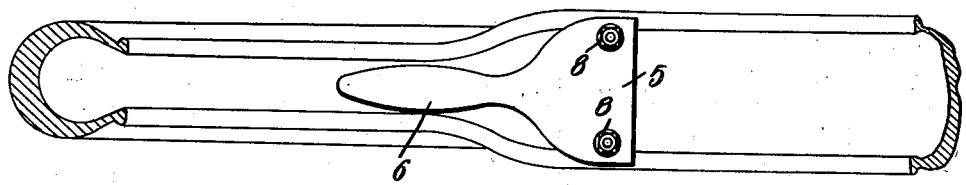
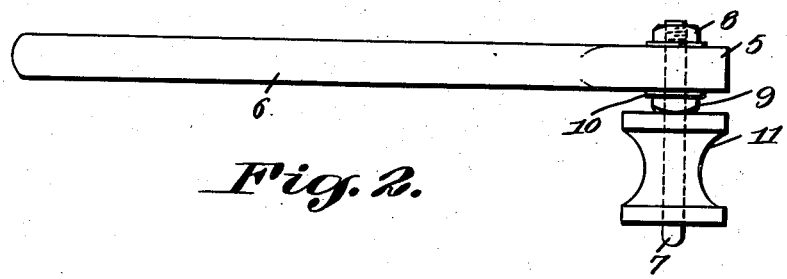
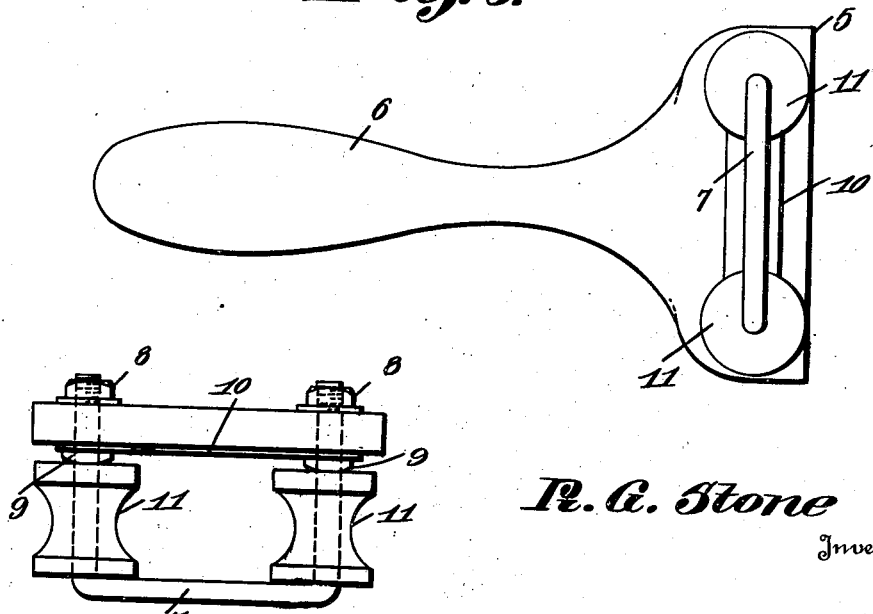

1,521,727

UNITED STATES PATENT OFFICE.

RUFUS G. STONE, OF GARDEN CITY, KANSAS.

TIRE TOOL.

Application filed April 24, 1924. Serial No. 708,773.

*To all whom it may concern:*

Be it known that I, RUFUS G. STONE, a citizen of the United States, residing at Garden City, in the county of Finney and State of Kansas, have invented a new and useful Tire Tool, of which the following is a specification.

This invention relates to a tire tool and aims to provide novel means whereby the side walls of a tire shoe may be spread to facilitate the repairing of the tire.

Another important object of the invention is to provide a tool of this character which may be readily and easily positioned in a tire shoe, and one which when positioned, will be held against accidental displacement.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a fragmental sectional view through a tire shoe disclosing an expanding tool positioned therein.

Figure 2 is a side elevational view of the tool.

Figure 3 is a bottom plan view thereof.

Figure 4 is an end elevational view of the tool.

Referring to the drawing in detail, the tool includes a relatively wide body portion 5 having a handle portion 6 formed integral therewith, whereby the tool may be conveniently manipulated to accomplish its purpose.

A supporting member indicated at 7, is in the form of a U-shaped wire having its ends positioned in suitable openings formed in the body portion 5. The ends of the U-shaped wire are supplied with threads 8 and 9 respectively, which nuts are adapted to grip opposite sides of the body portion 5 and hold the member 7 against movement.

In order that the ends of the supporting member 7 will be securely held against movement towards and away from each other, a plate 10 is provided, which plate extends along the upper surface of the body 5 and is formed with openings to accommodate the end portions of the supporting member as clearly shown by Figure 4 of the drawing.

Mounted on the ends of the supporting member 7 are rollers 11 which are formed with grooved peripheries adapting them for the reception of the beaded portions of the tire, eliminating any possibility of the tool slipping from its position between the walls of a tire shoe after it has been positioned to spread the walls thereof.

In the use of the device, the tool is positioned between the walls of a tire shoe whereupon the tool is twisted to a position as shown in full lines in Figure 1, with the result that the side walls of the tire shoe are spread apart providing a clearance to permit a repairman to repair the tire shoe.

While I have shown and described an expanding tool as positioned between the walls of a tire shoe, it is to be understood that it may be desirable to employ two of these tools in order to expand the walls of the tire shoe, and hold the walls in spaced relation.

I claim:—

A tire tool comprising a handle portion having an elongated head formed at one end, a U-shaped supporting member having its ends positioned in the head, rollers mounted on the U-shaped supporting member, portions of the U-shaped supporting member extending beyond the outer ends of the rollers to provide a guiding member, and means for securing the U-shaped supporting member to the head.

In testimony that I claim the foregoing as my own, I have hereto affixed my signature in the presence of two witnesses.

RUFUS G. STONE.

Witnesses:
WM. EASTON HUTCHISON,
E. S. DIR.